United States Patent [19]

Iino

[11] Patent Number: 4,973,942

[45] Date of Patent: Nov. 27, 1990

[54] DISPLAY APPARATUS FOR AUTOMOBILES

[75] Inventor: Tadashi Iino, Susono, Japan

[73] Assignee: Yazaki Corporation, Tokyo, Japan

[21] Appl. No.: 468,333

[22] Filed: Jan. 22, 1990

[51] Int. Cl.$^5$ ............................................. B60Q 1/00
[52] U.S. Cl. .................................. 340/438; 340/461;
340/980; 340/705
[58] Field of Search ............... 340/438, 461, 462, 485,
340/971, 980, 705

[56] References Cited

U.S. PATENT DOCUMENTS

| | | | |
|---|---|---|---|
| 3,317,906 | 5/1967 | Baldridge | 340/461 |
| 4,635,033 | 1/1987 | Inukai et al. | 340/461 |
| 4,636,782 | 1/1987 | Nakamura et al. | 340/461 |
| 4,831,366 | 5/1989 | Iino | 340/461 |

Primary Examiner—Donnie L. Crosland
Attorney, Agent, or Firm—Armstrong, Nikaido, Marmelstein, Kubovcik & Murray

[57] ABSTRACT

A display apparatus used in automobiles has an indicating device mounted in the steering column to display the car running condition information and a reflecting plate installed in the dashboard to form a virtual image of displayed information at a point on the far side of the reflection surface from the driver. To make it more easy for the driver to see the displayed information, the apparatus incorporates a magnifying cylindrical lens which is installed between the indicating device and the reflection plate in such a way that the display surface of the indicating device is within the focal length of the lens. The virtual image of the displayed information is thus magnified by the lens and formed farther away from the driver's viewing point, making the displayed information more easily recognizable. Another feature of the apparatus is that the cylindrical lens can also be moved to a desired position to magnify the displayed information to any desired size for the driver.

5 Claims, 7 Drawing Sheets

DISPLAY APPARATUS FOR AUTOMOBILES

BACKGROUND OF THE INVENTION

1. Field of the Invention

The present invention relates to an automotive display apparatus in which car running condition information such as car speed displayed on an indicating device is reflected by a reflection surface located in front of the driver's seat so that a driver can see the displayed information via the reflection surface.

2. Description of the Prior Art

A conventional automotive display apparatus of this kind is shown in FIG. 16. In this apparatus, an indicating device accommodating portion 20a is formed in a column cover 20 which encloses a steering rod. An indicating device 50 that displays various operation information is installed in each of the column cover 20 and the indicating device accommodating portion 20a on the side facing the windshield 10. A reflection member 30 with its reflecting surface directed toward the driver's seat is mounted on a dashboard 40 so that the displayed information on the indicating device 50 is reflected by the reflecting member 30 toward the driver. When the driver looks, from around the point 60, at the reflection member, he or she can see a virtual image X of the indicating device 50. That is, the operation information is recognized by the driver.

In this way, when the displayed information on the indicating device is reflected by the reflection surface, the image of the displayed information (virtual image X) is seen at a point on the far side of the reflection surface. This allows the driver, who is looking ahead driving, to recognize the displayed information with only a small change in his line of sight or focus.

Although such a remote display of information can reduce a change in the driver's line of sight or focus by forming the virtual image X as remote as possible from the driver's viewing position, it has the following drawback. The size of an image actually seen by the driver decreases as the distance to the virtual image X from the viewer increases. In other words, the very attempt to improve the level of visibility of displayed information by setting the image formation point as far away from the driver's eyes will degrade the visibility in terms of the image size. Increasing the size of the indicating device itself to solve this problem is not acceptable because of the limited space in the driver's cabin.

SUMMARY OF THE INVENTION

In light of the above problems, it is an object of this invention to provide an automotive display apparatus that uses a reflection surface to form a virtual image of display at a point remote from the driver and which can make the displayed information easier to see by increasing the size of the virtual image.

To achieve the above objective, the automotive display apparatus according to this invention comprises: a reflection surface located in front of the driver's seat, the reflection surface being adapted to reflect the car running condition information displayed on an indicating device toward the driver; and a magnifying lens located between the indicating device and the reflection surface in such a way that the surface of the indicating device is situated inside the focal length of the magnifying lens.

When viewed from the driver, the displayed information on the indicating device is seen via the magnifying lens and the reflecting surface. That is, the virtual image of the display is magnified by the lens and formed at a point farther away from the driver than when no magnifying lens is provided.

DESCRIPTION OF THE PREFERRED EMBODIMENTS

Figure 1:
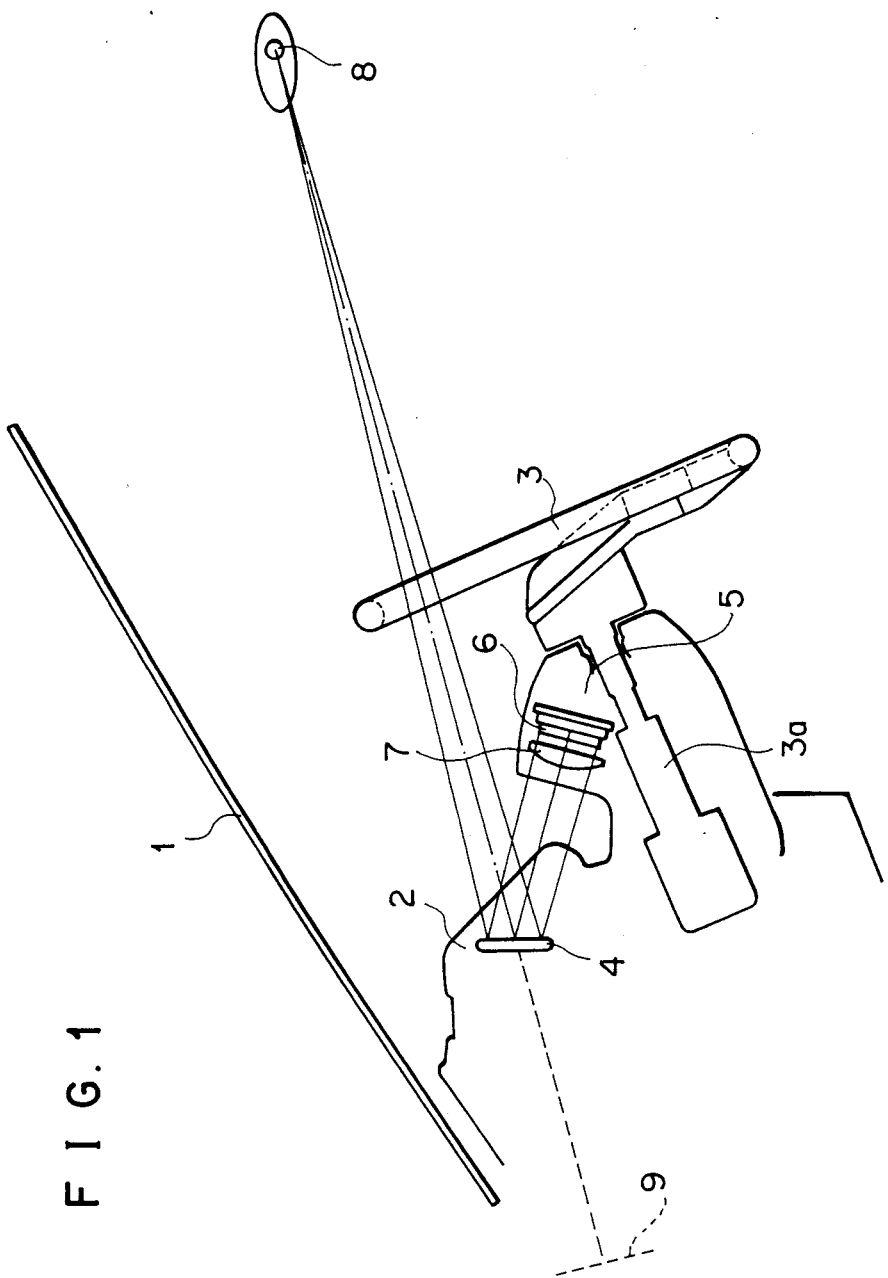
FIG. 1 is a cross-sectional view showing an automotive display apparatus as a first embodiment of the invention.
Figure 4:
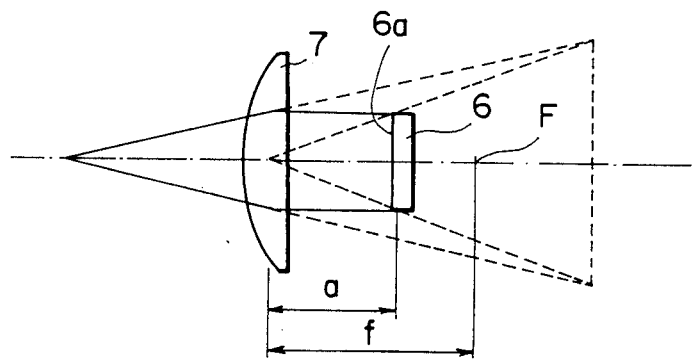
FIG. 4 is a diagram showing how the image is magnified in the first embodiment.

FIG. 1 is a cross section showing an automotive display apparatus as a first embodiment of the invention. In the figure, reference numeral 1 represents a windshield, 2 an instrument panel, and 3 steering wheel. Fitted on the instrument panel 2 is a reflection plate 4 with its reflection surface directed toward the driver's seat. Installed in the upper part of a steering column 5 enclosing a steering shaft 3a of the wheel 3 is an indicating device 6 with its display surface directed toward the reflection plate 4. The indicating device 6 displays information such as car speed. The indicating device 6 is of a self-illuminating type, which may use a fluorescent display tube, a light emitting diode, or a transmission type liquid crystal with backlighting. In front of the indicating device 6 is arranged a convex cylindrical lens 7 which can be moved toward and away from the device 6, as described later. The display surface 6a of the indicating device 6 is situated within the focal length f of the cylindrical lens 7, as shown in FIG. 4.

When a driver sees, from the viewing point 8, the surface of the reflection plate 4 through the inside of the steering wheel 3, the display on the indicating device 6 is magnified by the cylindrical lens 7 and its virtual image 9 is seen at the front of the vehicle remote from the driver's viewing point.

Figure 2:
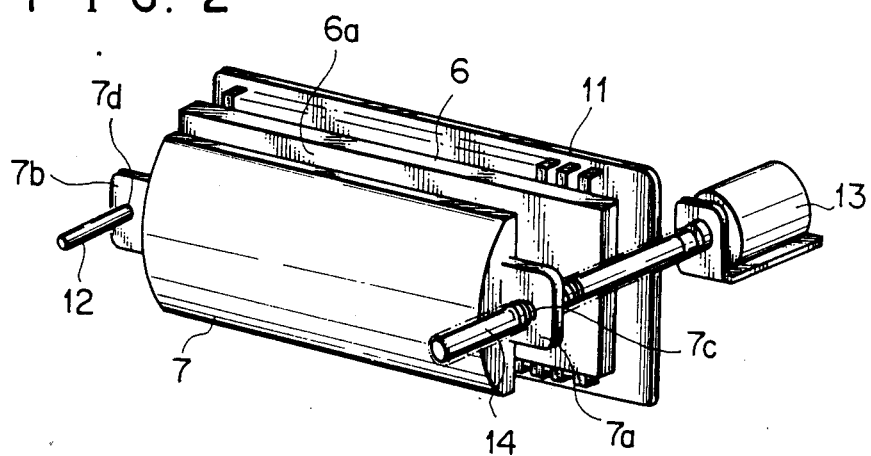
FIG. 2 is a perspective view showing the detail of an indicating device and a magnifying lens in the first embodiment.

FIG. 2 shows the detail of the indicating device 6 and the cylindrical lens 7. The indicating device 6 is secured and connected to a printed circuit card 11 that has a display driver and other circuits. The cylindrical lens 7 is arranged in front of the display surface 6a. The cylindrical lens 7 has a pair of support pieces 7a, 7b one on each side, with the support piece 7a formed with a threaded hole 7c and the support piece 7b with a guide hole 7d.

The guide hole 7d of the support piece 7b is slidably sleeved over a guide rod 12 which is disposed perpendicular to the surface 6a of the indicating device 6. A male screw 14 mounted to the rotating shaft of a motor 13 and disposed parallel to the guide rod 12 is screwed into the threaded hole 7c of the support piece 7a. As the motor 13 is driven, the male screw 14 is rotated causing the cylindrical lens 7 to move in the direction of axis of the guide rod 12 and the male screw 14. The cylindrical lens 7, therefore, moves toward or away from the display surface 6a depending on the rotating direction of the motor 13.

Figure 3:
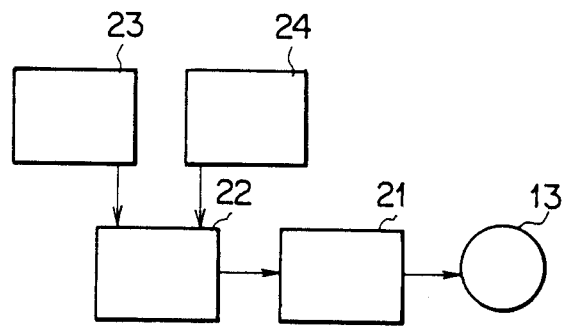
FIG. 3 is a block diagram of the first embodiment.

FIG. 3 is a block diagram of a control means that drives the motor 13. A motor drive circuit 21, which performs a rotating direction control and a start/stop control on the motor 13, is controlled by a CPU 22 such as microprocessor. The CPU 22 is connected with a speed sensor 23 that measures the speed of the vehicle and with a manual switch that is manipulated by a driver. The CPU 22 controls the motor drive circuit 21 according to the car speed detected by the speed sensor 23 or to the state of the manual switch 24.

Generally, the driver's field of vision ahead is narrow when the car is traveling at high speeds. It is therefore necessary to enhance the visibility of the displayed information by increasing the size of its image. For this purpose, the CPU 22 is set with predetermined car speed information so that when the car speed detected by the speed sensor 23 exceeds the setting, the CPU 22 controls the motor drive circuit 21 to drive the motor 13 and magnify the image of the displayed information.

The CPU 22 also controls the motor drive circuit 21 according to the state of the manual switch 24 to change the position of the cylindrical lens 7 along the guide rod 12 and thereby magnify the image of display to any desired size. Let f stand for the focal length of the cylindrical lens 7 and a for the distance from the cylindrical lens 7 to the display surface 6a, as shown in FIG. 4. Then the magnifying power M is expressed as $$M = \frac{f}{f - a}$$

In the above embodiment, the cylindrical lens with its surface curvature vertically disposed is used as a magnifying lens, so that the image will be expanded in the vertical direction. If the curvature of the lens surface is formed in the lateral direction, the image will be laterally magnified. It is, of course, possible to magnify the entire image by using an ordinary convex lens.

Figure 5:
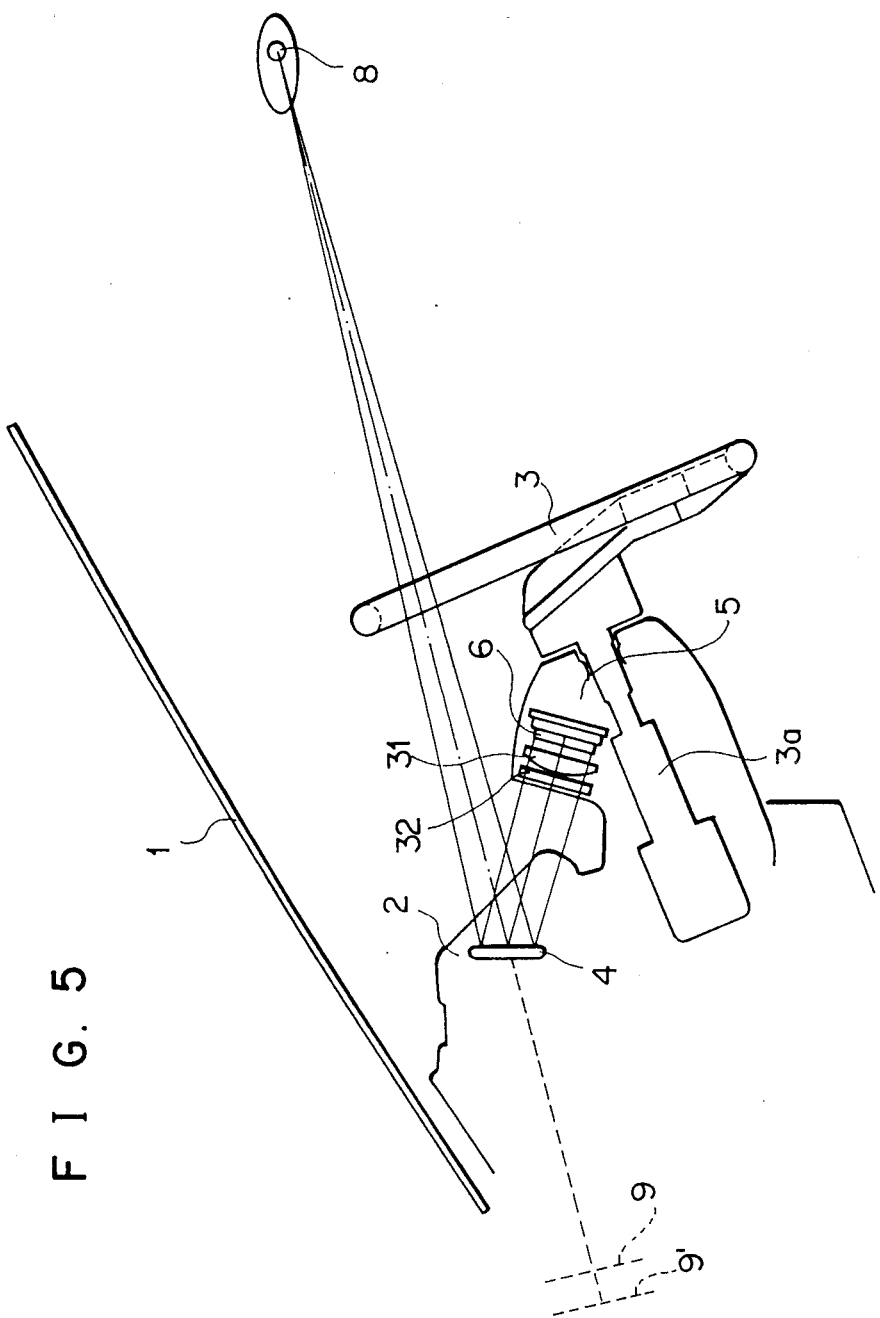
FIG. 5 is a cross-sectional view showing an automotive display apparatus as a second embodiment of the invention.

FIG. 5 shows a second embodiment of the automotive display apparatus according to this invention. Components identical to those of the first embodiment are given like reference numerals. In the figure, reference number 31 denotes a first cylindrical lens arranged in front of and movable toward and away from the indicating device 6. Designated 32 is a second cylindrical lens that cooperates with the first cylindrical lens 31 and which is arranged laterally movable with respect to the first cylindrical lens 31. The displayed information on the indicating device 6 is vertically magnified by the first cylindrical lens 31 and then a part of the magnified image is further magnified in the lateral direction by the second cylindrical lens 32. When the driver looks, from the viewing point 8, at the reflection surface of the reflection plate 4, the magnified virtual images 9, 9' can be seen at the image formation point at the front of the car.

Figure 6:
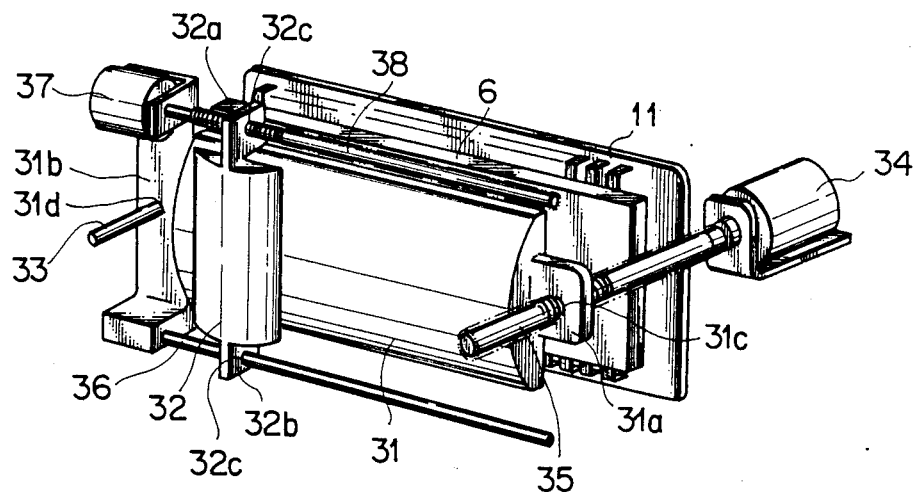
FIG. 6 is a perspective view showing the detail of an indicating device and a magnifying lens in the second embodiment.

FIG. 6 shows the detail of the indicating device 6 and the first and second cylindrical lenses 31, 32. The first cylindrical lens 31 is arranged so that its cylindrical axis is disposed in the lateral direction with respect to the indicating device 6. The first cylindrical lens 31 has support pieces 31a, 31b one on each lateral side, with the support piece 31a formed with a threaded hole 31c and the other support piece 21b with a guide hole 31d.

The guide hole 31d of the support piece 31b is slidably sleeved over a guide rod 33 disposed perpendicular to the surface 6a of the indicating device 6. A male screw 35, which is disposed parallel to the guide rod 33 and mounted to the rotating shaft of a first motor 34, is screwed into the threaded hole 31c.

As the first motor 34 is driven, the male screw 35 is rotated, causing the first cylindrical lens 31 to move in the axial direction of the guide rod 33 and the male screw 35. The first cylindrical lens 31, therefore, is moved toward or away from the display surface 6a depending on the rotating direction of the first motor 34.

The second cylindrical lens 32 is positioned in front of the first cylindrical lens 31 and its cylindrical axis is disposed perpendicular to that of the first cylindrical lens 31. The axial length of the second cylindrical lens 32 is set almost equal to the width of the first cylindrical lens 31. The width of the second cylindrical lens 32 is such that the lens 32 covers a part of the first cylindrical lens 31.

The second cylindrical lens 32 has support pieces 32a, 32b at the top and bottom ends, with the upper support piece 32a formed with a threaded hole 32c and the lower support piece 32b with a guide hole 32d.

The support piece 31b of the first cylindrical lens 31 is mounted with a guide rod 36 extending parallel to the cylindrical axis of the first lens 31 and with a second motor 37. The rotating shaft of the second motor 37 is mounted with a male screw 38 extending parallel to the guide rod 36.

The guide hole 32d of the lower support piece 32b of the second cylindrical lens 32 is slidably sleeved over the guide rod 36, while the threaded hole 32c of the upper support piece 32a receives the male screw 38.

As the second motor 37 is driven, the male screw 38 is turned and the second cylindrical lens 32 is moved to the right or left along the axis of the guide rod 36 and male screw 38 depending on the rotating direction of the second motor 37.

Figure 7:
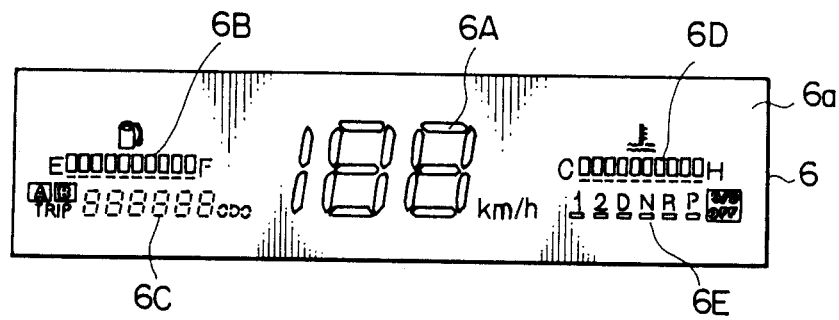
FIG. 7 is a display pattern displayed on the surface of indicating device.

FIG. 7 shows a display pattern on the surface 6a of the indicating device 6. What is shown here as the display pattern, however, is actually its image seen via the reflection plate 4 for the purpose of allowing comparison with example displays to be described later. That is, the actual display pattern on the indication surface 6a is laterally reversed. In FIG. 7, reference numeral 6A denotes a speed meter segment, 6B a fuel meter segment, 6C an odometer segment, 6D a temperature indicator segment, and 6E a gear select position indicator segment.

Figure 8:
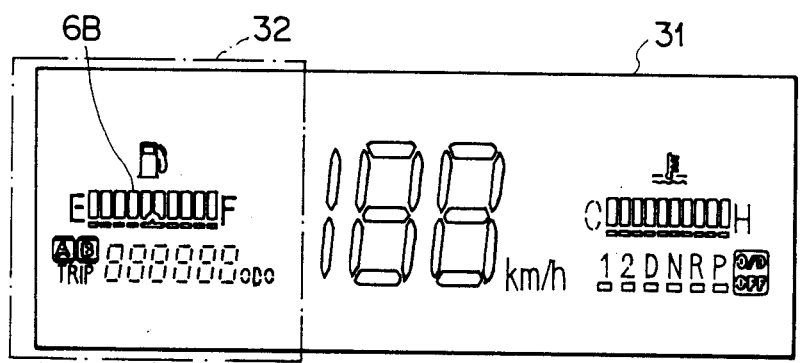
FIG. 8 is a display pattern in the second embodiment with a second cylindrical lens moved to one example position.

FIG. 8 shows one example position where the second cylindrical lens 32 is moved. On the display pattern that is vertically magnified by the first cylindrical lens 31, the second cylindrical lens 32 is situated at the fuel meter segment 6B.

Figure 9:
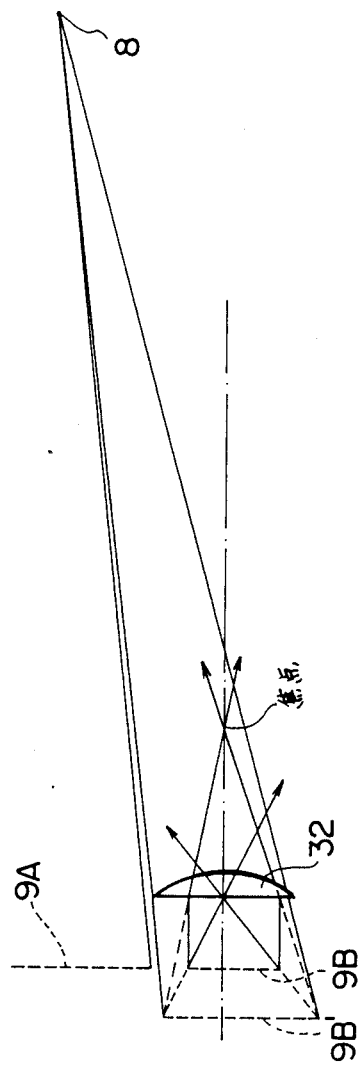
FIG. 9 is a plan view showing the optical positional relationship under the condition of FIG. 8.
Figure 10:
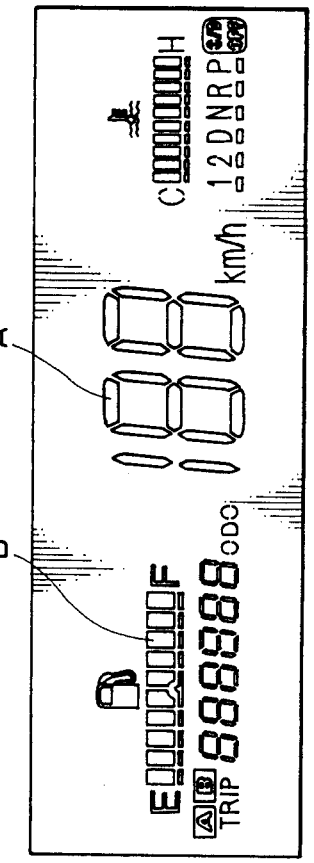
FIG. 10 is an example display in the second embodiment showing a fuel meter display segment magnified.

The optical positional relationship in this condition is shown in FIG. 9. The first cylindrical lens 31 forms vertically magnified virtual images 9A, 9B of the speed meter segment 6A and fuel meter segment 6B. Of these virtual images 9A, 9B, the image 9B is further magnified in the lateral direction by the second cylindrical lens 32 to form a virtual image 9B'. When viewed from the position 8, the virtual images 9A and 9B' are seen situated side by side. That is, when the driver looks from the viewing point 8 at the reflection plate 4, he or she can see the vertically and laterally expanded display pattern B of the fuel meter segment 6B situated adjacent to the vertically expanded image A of the speed meter segment 6A, as shown in FIG. 10.

Figure 13:
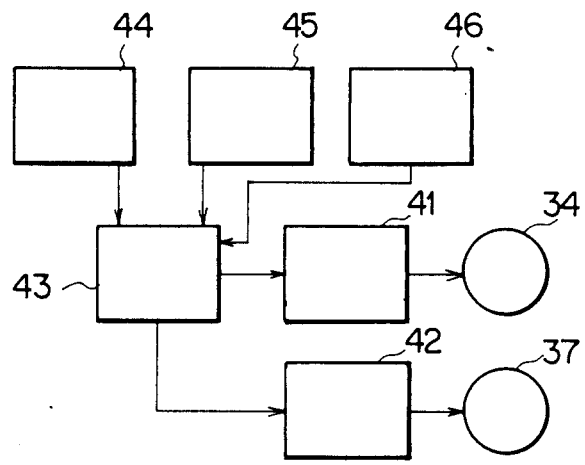
FIG. 13 is a block diagram of the second embodiment.

FIG. 13 is a block diagram of the control means to drive the first and second motors 34, 37 in the second embodiment. The motor drive circuits 41, 42 are each controlled by a CPU 43 such as microprocessor to perform the rotation direction control and drive control on the first and second motors 34, 37 individually. The CPU 43 is connected with a speed sensor 44 that measures the traveling speed of the car and with manual switches 45, 46 that are manipulated by the driver. The CPU 43 thus controls the motor drive circuits 41, 42 according to the outputs of the speed sensor 44 and the manual switches 45, 46.

Figure 11:
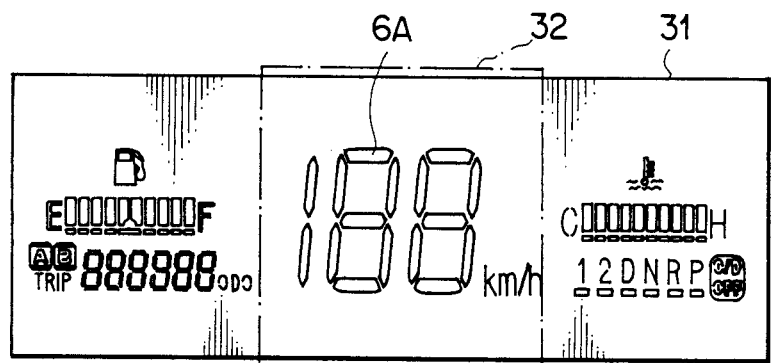
FIG. 11 is a display pattern in the second embodiment with a second cylindrical lens moved to another example position.
Figure 12:
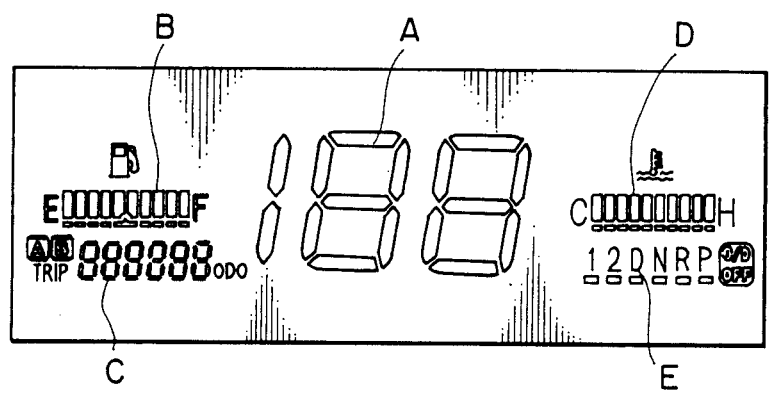
FIG. 12 is an example display in the second embodiment showing a speed meter display segment magnified.

The CPU 43 is set with predetermined car speed information. When the car speed detected by the speed sensor 44 exceeds the setting, the CPU 43 controls the motor drive circuit 41 to start the first motor 34 and thereby move the first cylindrical lens 31 to a predetermined position to vertically magnify the display. At the same time the CPU 43 also controls the motor drive circuit 42 to drive the second motor 37 and thereby move the second cylindrical lens 32 to the speed meter segment 6A, as shown in FIG. 11.

As a result, one can see the display sections B, C, D, E vertically magnified by the first cylindrical lens 31 and also a speed meter display A further magnified in the lateral direction by the second cylindrical lens 32.

The CPU 43 also controls the motor drive circuits 41, 42 according to the manipulated state of the manual switches 45, 46 to move the first cylindrical lens 31 back and forth and the second cylindrical lens 32 right and left to a desired position so that the entire display can be vertically magnified to a desired size and that any display section can be selected for lateral magnification.

Figure 14:
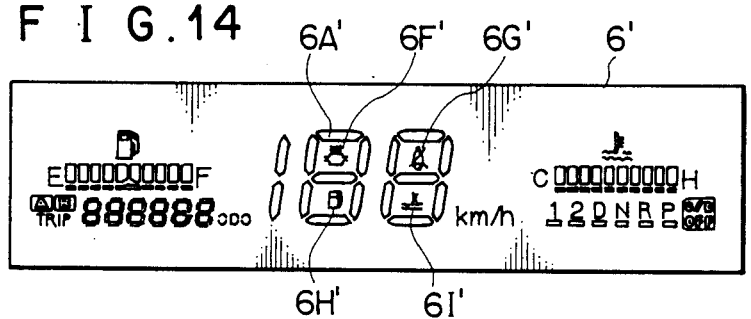
FIG. 14 is a display pattern of a third embodiment.

FIG. 14 shows a third embodiment of the invention. As in the second embodiment, the first and second cylindrical lenses are used. The display pattern on the indicating device 6, has warning segments 6F' through 6I' located at empty spaces in the speed meter segment 6A'.

Figure 15:
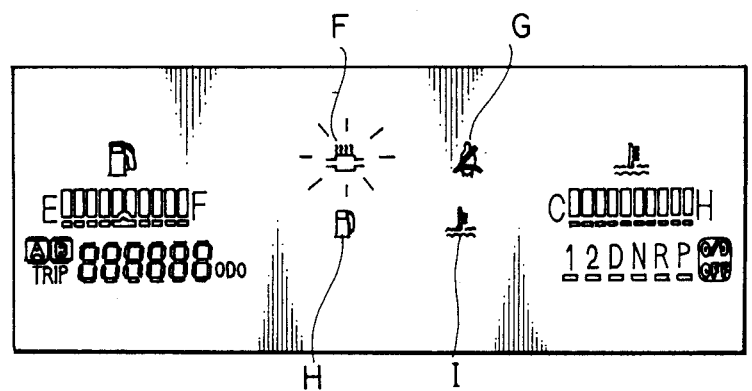
FIG. 15 is an example display in the third embodiment.
Figure 16:
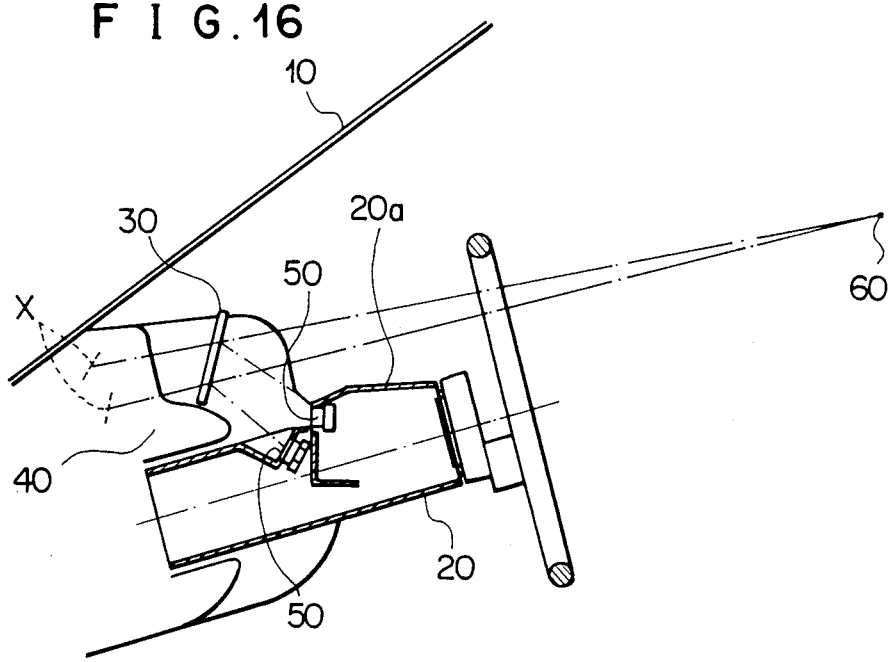
FIG. 16 is a cross-sectional view of a conventional automotive display apparatus using a reflection member.

The apparatus of this embodiment is suited for application on a so-called head-up display which has another speed meter on an instrument panel and utilizes the windshield as a reflection surface. When a warning state occurs, one of the warning segments 6F' to 6I' that corresponds to the alerted condition is illuminated and at the same time the speed meter segment 6A, is turned off. In response to the warning segment being turned on, the second cylindrical lens is moved to the speed meter segment 6A' by the same control means as used in the second embodiment. Then, as shown in FIG. 15, warning sign or symbols F to I that are magnified vertically as well as laterally appear on the display. The figure shows all the warning symbols illuminated.

In this way, the display segments on the indicating device are magnified by the first and second cylindrical lenses, making them, even if small, easily recognizable. This in turn allows small segments to be located in unoccupied spaces in other display segments, helping to reduce the size of the display pattern.

In summary, the automotive display apparatus according to this invention, in which a reflection surface is used to form a virtual image of the display at a distant point from the driver, has the following advantages. Since a magnifying lens is installed between the indicating device and the reflection surface and the surface of the indicating device is located within the focal length of the lens, the virtual image of the display is magnified by the lens and formed at a point farther away, making the display easily recognizable.

While the invention has been particularly shown and described in reference to preferred embodiments thereof, it will be understood by those skilled in the art that changes in form and details may be made therein without departing from the spirit and scope of the invention.

What is claimed is:

1. An automotive display apparatus comprising:
   a reflection surface located in front of the driver's seat, the reflection surface being adapted to reflect the vehicle running condition information displayed on an indicating device toward the driver; and
   a magnifying lens located between the indicating device and the reflection surface in such a way that the surface of said indicating device is situated within the focal length of the magnifying lens, said magnifying lens being automatically or manually controlled dependent on the speed of said vehicle for controlling the size of said vehicle running condition information reflected onto said reflection surface.

2. An automotive display apparatus as set forth in claim 1, wherein said magnifying lens is a cylindrical.

3. An automotive display apparatus as set forth in claim 1, wherein said magnifying lens consists of a first cylindrical lens whose axis is directed laterally horizontal with respect to the indicating device and a second cylindrical lens whose axis is directed perpendicular to the axis of the first cylindrical lens, and the second cylindrical lens is installed so as to be movable in the direction of the first cylindrical lens axis.

4. An automotive display apparatus as set forth in claim 3, wherein said second cylindrical lens is positioned in front of said first cylindrical lens, the axial length of said second cylindrical lens being almost equal to the width of said first cylindrical lens, whereby said second cylindrical lens covers a part of said first cylindrical lens.

5. An automotive display apparatus as set forth in any one of claim 1 to 4, wherein said indicating device has warning segments located at empty spaces in the speed meter segment thereof, so that when a warning state occurs, one of said warning segments that corresponds to the alerted condition is illuminated and the speed meter segment is turned off simultaneously.

* * * * *